United States Patent [19]

Sauder

[11] 4,379,382

[45] Apr. 12, 1983

[54] METHOD AND APPARATUS FOR INSULATING A FURNACE HAVING A CORROSIVE ATMOSPHERE

[75] Inventor: Robert A. Sauder, Emporia, Kans.

[73] Assignee: Sauder Industries, Inc., Emporia, Kans.

[21] Appl. No.: 155,173

[22] Filed: Jun. 2, 1980

[51] Int. Cl.[3] .......................... F27D 1/00; C04B 43/02; B23P 21/00; E04B 1/80

[52] U.S. Cl. .......................................... 52/506; 52/513; 110/336

[58] Field of Search ..................... 52/506, 513; 110/336

[56] References Cited

U.S. PATENT DOCUMENTS

| | | | |
|---|---|---|---|
| 3,706,870 | 12/1972 | Sauder et al. | 219/99 X |
| 3,819,468 | 6/1974 | Sauder et al. | 52/699 X |
| 3,832,815 | 9/1974 | Balaz et al. | 52/506 |
| 3,892,396 | 7/1975 | Monaghan | 52/506 X |
| 3,940,244 | 2/1976 | Sauder et al. | 110/336 X |
| 3,949,144 | 4/1976 | Duff | 52/600 X |
| 3,952,470 | 4/1976 | Byrd, Jr. | 52/513 |
| 3,993,237 | 11/1976 | Sauder et al. | 52/745 X |
| 4,001,996 | 1/1977 | Byrd, Jr. | 52/513 X |
| 4,032,742 | 6/1977 | Kendrich et al. | 219/99 |
| 4,154,975 | 5/1979 | Sauder | 13/25 |
| 4,177,036 | 12/1979 | Sauder | 432/251 X |

*Primary Examiner*—Alfred C. Perham
*Attorney, Agent, or Firm*—Arnold, White & Durkee

[57] ABSTRACT

A high temperature insulation module having a ceramic fiber mat defining a hot face, another ceramic fiber mat defining a cold face and a support member positioned intermediate the mats and generally at a location where during operation of the furnace, the temperature of the support member exceeds that at which corrosive gases can condense to form liquid corrosives which would otherwise act upon the support member is disclosed. The ceramic fiber mats may be comprised of resilient material, and the support member is relatively rigid with respect to the mats. In addition, a fastener may be carried by the module and actuated by introducing a tool through the hot face of the module, or a fastener may be introduced into the module and actuated through the hot face at the time of installation. Cement is preferably used to affix the support member to the fiber mats.

19 Claims, 8 Drawing Figures

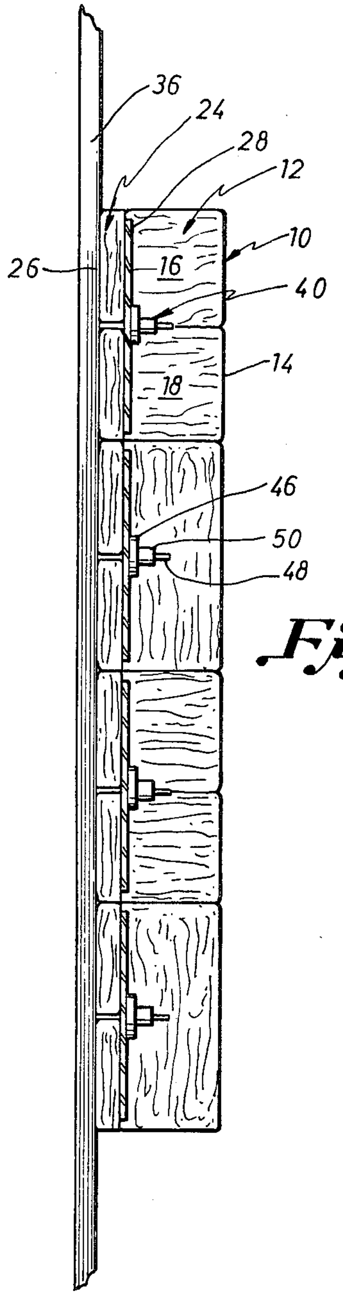
Fig. 4
Fig. 1
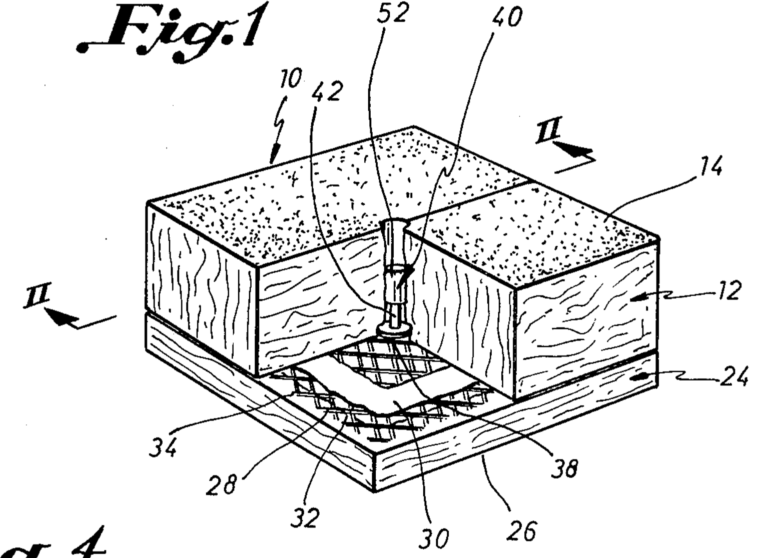
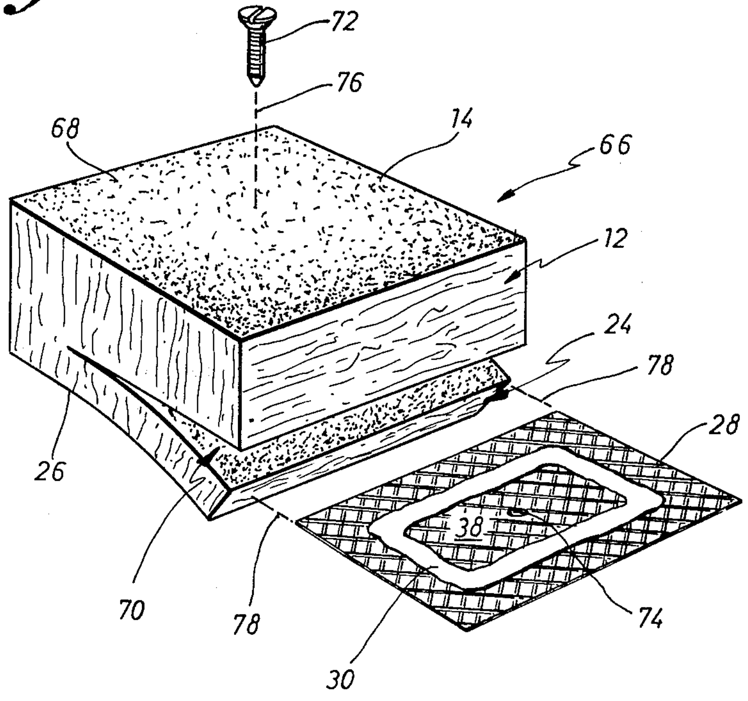
Fig. 8

*Fig. 6*
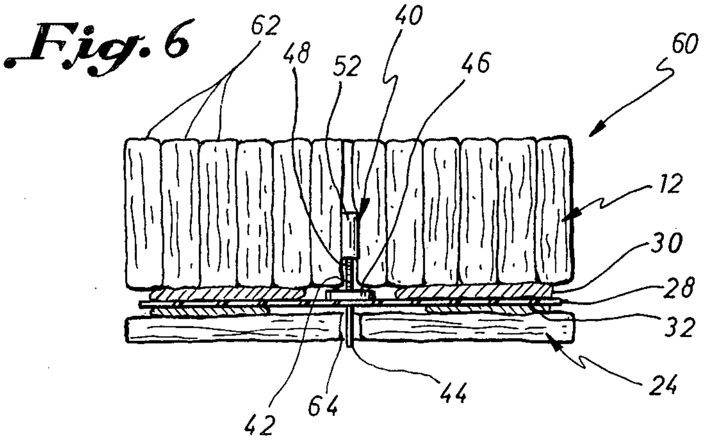
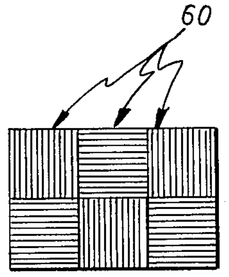
*Fig. 7*
*Fig. 2*
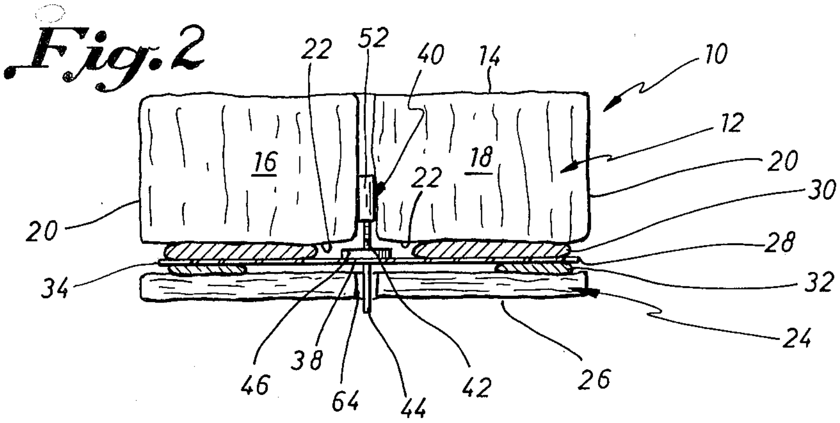
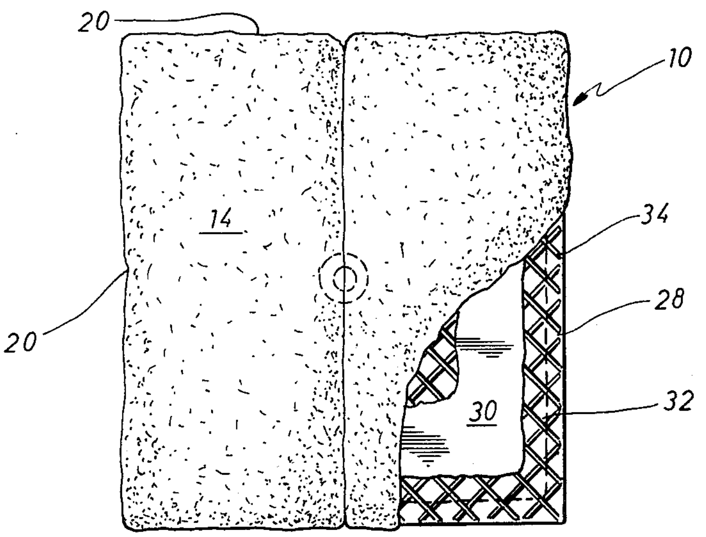
*Fig. 3*
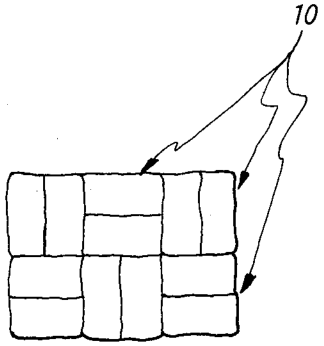
*Fig. 5*

METHOD AND APPARATUS FOR INSULATING A FURNACE HAVING A CORROSIVE ATMOSPHERE

CROSS-REFERENCE TO RELATED APPLICATIONS

This application is related to application Ser. No. 674,502 filed Apr. 7, 1976, and entitled "Method and Apparatus for Providing High Temperature Internal Insulation"; application Ser. No. 949,386, filed Oct. 6, 1978, and entitled "Method for Providing High Temperature Insulation"; and application Ser. No. 949,384, filed Oct. 6, 1978, and entitled "High Temperature Insulation Module".

BACKGROUND OF THE INVENTION

This invention relates generally to a novel method and apparatus for insulating the interior of a high temperature chamber or furnace. More particularly, this invention is concerned with minimizing the deleterious effects of a highly corrosive atmosphere in an industrial furnace on an insulation lining attached to the internal walls of the furnace.

In the past, it is been known to line the interior of high temperature chambers or furnaces with ceramic fiber insulation material manufactured into modules. See for example U.S. Pat. Nos. 3,819,468; 3,993,237; 3,706,870; 4,154,975; 3,940,244; 4,032,742; and 4,177,036, all of which are assigned to the assignee of the present application, Sauder Industries, Inc., Emporia, Kans. These patents relate to high temperature ceramic fiber insulation modules capable of insulating furnaces having interior temperatures in excess of 2300° F. By "high temperature", applicant means temperatures in excess of 1600° F. and more particularly temperatures falling in the range of 1600° F. to 2800° F.

The modules disclosed in the above-noted patents have been very successful in insulating furnaces wherein it is desirable to maintain a casing temperature of the furnace in the order of 200° F. to 300° F. or even cooler while at the same time generating a high temperature environment within the interior chamber of the furnace. Furnaces insulated with the above-noted products have performed most satisfactorily. Whereas known arrangements have exhibited a satisfactory level of utility in insulating high temperature chambers, room for significant improvement remains.

It is believed that in environments containing highly corrosive gases, for example, those containing sulfur compounds, it is common to experience a corrosive action on metallic fastening hardware or support substrates. Whereas the ceramic fibers of the insulation material exposed to such a chemically hostile environment remain substantially unaffected, the fastening hardware or support substrate or the cement bonding the fiber to the substrate may deteriorate to such an extent that the structural integrity of the insulation material is threatened.

Particular problems have been noted in instances where sulfur containing gases have been generated in furnace chambers and have penetrated the ceramic insulation material into the cooler regions of the furnace. In these cooler regions, usually along the surface of the cold face of the insulation material, the sulfur containing gases condense together with some water vapor to produce a relatively strong concentration of acid. The effects of sulphur containing acids on metal are well known.

Most recently it has been discovered that sulfur containing acids may have an adverse effect over a period of 6 to 18 months on ceramic mortars, or even to ceramic fiber itself where such contact is prolonged.

Recognizing the need for an improved method and apparatus for insulating the interior chamber of a high temperature furnace, it would, therefore, be desirable to provide a high temperature industrial furnace module which may be easily installed and which minimizes the undesirable effects of a corrosive atmosphere on the support structure and attachment mechanism of such module.

The problem stated in the foregoing is not intended to be exhaustive but rather is among others which tend to impair the effectiveness of previously known insulation modules used in conjunction with high temperature furnaces operating in a highly corrosive atmosphere.

FEATURES AND SUMMARY OF A PREFERRED EMBODIMENT OF THE INVENTION

Recognizing the need for an improved high temperature internal insulation module, it is, therefore, a feature of the present invention to provide a novel insulation module which minimizes or reduces the problems of modules operating in highly corrosive atmospheres.

It is a more particular feature of the present invention to provide a novel insulation module which has a support structure situated in a region of the module wherein the temperature will exceed that required for condensation of water vapor to substantially prevent the formation of sulphur containing acids on such support structure.

Yet another feature resides in positioning the ceramic cement/fiber interface in a region of the insulation module whereat the temperature is high enough to prevent the formation of liquid sulfur-containing compounds.

Still another feature resides in not increasing the thickness of known insulation modules to avoid the deleterious effects of corrosive liquid on the support structure of such modules.

A related feature of the present invention involves a cooperation between the support structure and attachment mechanism for the module which minimizes the material vulnerable to sulphur containing acids present at the cold face of the module whereat such corrosive liquids may condense.

A collateral feature of the present invention is a fastener which is buried within the insulation material to protect the fastener from the heat of the high temperature chamber as well as from the corrosive effects of condensates of corrosive gases in the furnace.

A high temperature insulation module according to a presently preferred embodiment of the invention intended to substantially incorporate the foregoing features includes a first ceramic fiber mat operable to define a hot face of the module. A second ceramic fiber mat provides a cold face for the module, and a support member is positioned intermediate the first and second fiber mats. The support member cooperates with a fastener which is positioned below the hot face intermediate the hot face and the cold face and which is operable to attach the module to the wall of the furnace.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto.

Other features and advantages of the present invention will become apparent with reference to the following detailed description of preferred embodiments thereof in connection with the accompanying drawings, wherein like reference numerals have been applied to like elements, in which;

BRIEF DESCRIPTION OF THE DRAWINGS

FIG. 1 depicts a module according to the present invention in partially cutaway sectional perspective;

FIG. 2 is a cross-sectional view taken through section lines II—II of FIG. 1 and exploded vertically slightly to more clearly show the cement holding the module together;

FIG. 3 is a top view of the module shown in FIG. 2 with a portion cutaway to show an expanded metal support member held in position with cement;

FIG. 4 is a side view in partial cross-section showing adjacent modules attached to a furnace casing by means of a welding stud;

FIG. 5 shows a parquet-like arrangement of the insulation modules depicted in FIGS. 1 through 4;

FIG. 6 is a partial sectional view of an alternative embodiment of an apparatus embodying the invention;

FIG. 7 shows a parquet-like arrangement of the module depicted in FIG. 6; and

FIG. 8 depicts yet another alternative embodiment of a module incorporating the present invention wherein the fiber mat defining the hot face and the fiber mat defining the cold face of the module are fashion from a single block of resilient ceramic fiber which has been cut to receive a support member is adapted to receive a fastener.

DETAILED DESCRIPTION OF A PREFERRED EMBODIMENT

Turning now to the FIGS. 1–5 there is shown a module 10 embodying the apparatus of the present invention. The module 10 includes a first ceramic fiber mat 12 defining a hot face 14 of the module 10. The first ceramic fiber mat is comprised of two strips 16 and 18 having the approximate dimensions of 6 inches by 12 inches at their hot face and a thickness of about 3 inches. These two strips 16 and 18 are comprised of resilient ceramics fiber insulating material which is arranged with the fibers in planes. The planes are positioned substantially perpendicular to the hot face 14, and the fibers within each plane are generally randomly oriented within that plane.

The first ceramic fiber mat 12 has side edges 20. The bottom portion 22 of the first ceramic fiber mat 12 is not exposed when the module 10 is fully assembled.

The module 10 includes a second ceramic fiber mat 24 which defined the cold face 26 of the module 10. The second ceramic fiber mat 24 may be comprised of resilient ceramic fiber insulation of the blanket type which has been cut to approximately 12 inches by 12 inches at its cold face 26 and which has a thickness of approximately one inch. As will be pointed out more particularly below, the second ceramic fiber mat 24 may be comprised of material with the fibers arranged as in the case of the first mat 12, that is, with the fibers arranged in planes perpendicular to the hot or cold face of the module. Alternatively the second mat 24 may be comprised of a relatively rigid material such as vermiculite and which would function as a substrate for the entire module.

In a preferred embodiment, the module 10 includes a supporting member 28 having dimension slightly less than 12"×12", for example 11½"×11½" and which may be fashioned from a rigid material such as twelve gauge, flattened, expanded metal. The supporting member 28 functions as a stiffener to maintain the structural integrity of the module during handling, installation, and operation.

An upper layer 30 of cement may be applied generally around the outer edge or periphery of the top of supporting member 28 to bond the first mat 12 to the supporting member 28. A lower layer 32 of cement may be applied generally around the edges of the bottom of the supporting member 28 to bond the second mat 24 to the supporting member. It will, of course, be appreciated that with some materials, such as expanded metal, cement may be applied to only one surface or side of the supporting member and adequate bonding contact can be made with both mats. Some supporting members 28, such as solid members, will require that cement be applied to both the top and bottom to achieve suitable structural integrity.

It will be further appreciated that the second mat 24 may be mechanically attached with clips, pins, and the like (not shown) either in lieu of or in conjunction with the lower layer 32 of cement. The lower layer 32 of cement may consist of a relatively low temperature cement which serves to bond the second mat 24 to the module primarily during handling and installation of the module prior to firing of the furnace.

The supporting member 28 has outside edges 34 which may not extend to the sides 20 of the module 10. It has been found that during installation of modules, attachment can be facilitated by merely positioning one module snuggly against the next. The resiliency of the fiber comprising the first and second mats 12 and 24 may result in there being a slight compression at the edges 20 when modules 10 are positioned one-against-the-other during an installation. By selecting a dimension for the supporting member 28 which is somewhat less than the hot face 14 and cold face 26 dimensions of the module 10, coverage of the furnace wall or casing 36 is facilitated.

The approximate center 38 of the supporting member 28 defines a fastening zone against which a fastener 40 will bear when the module 10 is attached to the furnace wall 36. The fastener 40 may be of a weld-on type or of a screw-on type depending upon the particular installation. It has been found that a weld-on stud of the type disclosed in U.S. Pat. No. 3,706,870 assigned to Sauder Industries, Inc., Emporia, Kans., provides a satisfactory fastener for the module 10. It will of course be appreciated that a wide variety of fasteners may be utilized in connection with the attachment of the present module to a furnace wall. Not only are hardware such as studs, screws, bolts, and other metallic fastener suitable in the practice of the present invention, but also certain adhesives such as silicone and the like may be useful in adhesively applying the module to a furnace wall. In the case of an adhesive, it is preferably applied to the cold face of the second mat 24, and the module is positioned against the furnace casing with the adhesive being operable to hold the module in position.

In preferred form, the module 10 is attached to a furnace casing 36 by means of a weld-on stud 42. The stud 42 has a portion 44 which penetrates through the second mat 24 and extends beyond the cold face 26 prior to installation of the module. The stud 42 preferably has a washer 46 or some such similar device which bears against the supporting member 28 in such a manner that when the stud 42 is welded to the furnace casing, the washer 46 is available to hold the supporting member 28 in position. In preferred form, the weld-on stud has a threaded portion 48 which carries a nut 50 which may be tightened-down following welding of the stud 42 to the furnace casing 36.

A stud gun of the type disclosed in U.S. Pat. No. 4,032,742 assigned to Sauder Industries, Inc., Emporia, Kans., may be useful in fastening the module to the furnace casing.

With a stud gun, there is provided an arc welding power source having a terminal for conducting an electric current to the stud assembly. The stud gun is inserted into the hot face of the module and engages the stud assembly. The stud assembly is then welded to the furnace casing. Following the welding operation, the stud gun rotates the nut on the stud assembly to tighten the nut onto the supporting member. A stud gun control circuit may be utilized to provide timed, sequential operation of the arc welding power source and rotation apparatus to semiautomate the attachment procedure. The fastener may carry a removable sleeve portion 52 which covers the nut. The removable sleeve portion 52 may be manually removed from the stud assembly through the hot face of the module following attachment or affixation to the furnace wall. Alternatively, the stud gun may frictionally engage the fastener in such a manner to withdraw the removable sleeve when the stud gun is removed from the module.

As noted above, access to the fastener 40 is gained through the hot face 14 of the module. That is, the ceramic fiber material comprising the hot face of the module may be displaced to gain access to the fastener and to perform the attaching operation. Once the attachment has taken place and the stud gun or other suitable tool removed, the ceramic fiber will generally resume its previous alignment. The resiliency of the ceramic fibers may not be sufficient to immediately reposition the fibers into the position they occupied prior to displacement by the attachment tool. To facilitate the rearrangement of the fibers, the hot face of the module may be tapped or pinched manually.

It will be appreciated that the cement 30, 32 applied to the supporting member 28 should be applied only around the outer edges 32 of the supporting member in order to avoid interfering with the cooperation of the fastener 40 and the supporting member 28 during attachment of the module 10 to the furnace wall 26. The fastening zone 38, defined in the embodiment in FIGS. 1–5 by a 5 inch square zone with its center in the region of the supporting member, should remain generally free of cement both on the "hot" surface of the supporting member facing the first mat 12 and on the "cold" surface of the supporting member facing the second mat 24.

The modules may be installed at any desired location on a furnace wall. It has been found preferable to arrange the modules 10 in a parquet-like arrangement as shown in FIG. 5 to minimize the undesirable effects of shrinkage of the ceramic fiber during high temperature operation.

It will, of course, be appreciated that following installation of the modules 10 with the fastener 40 onto the furnace casing 36, the second mat 24 will be "sandwiched" or "clamped" into position by virtue of being positioned between the furnace casing 36 and the first mat 12. If the lower layer 32 of cement were of a low temperature organic type, the firing of the furnace could result in a complete burning of the lower layer 32 of cement. However, because of the clamping forces tending to hold the second mat 24 in position, the module 10 is believed to perform satisfactorily notwithstanding the loss of the bonding force of the lower layer 32 of cement. It has been contemplated that an outer wrapping (not shown) could be utilized to maintain the second mat 24 in position with respect to the remaining elements of the module 10 prior to installation with the expectation that the wrapper would immediately burn away upon firing of the furnace. Once the module 10 had been installed, the compression of the first ceramic fiber mat against the second ceramic fiber mat is believed adequate to maintain the structural integrity of the module.

An alternative embodiment 60 of the apparatus of the present invention as shown in FIGS. 6 and 7. In this embodiment, the first ceramic fiber mat 12 is comprised of a series of strips 62 of ceramic fiber blanket material which has been cut into approximately 1"×4"×12" strips and positioned side-by-side. It will of course be appreciated that the strips are held in the side-by-side arrangement by the cement 30 on the upper side of the supporting member 28. That is, the cement 30 on the upper side of the supporting member 28 serves to hold the strips in side-by-side alignment without any other structural member being required.

The handling of the first ceramic fiber mat 12 may be improved by the application of, say, an organic cement to the hot face thereof, or alternatively by the passing of wires transversely through the strips as suggested in U.S. Pat. No. 3,993,237 assigned to Sauder Industries, Inc., Emporia, Kans.

Although it may not always be necessary, in some instances it may facilitate attachment of the module to a furnace casing if the second ceramic fiber mat 24 has an aperture 64 pre-formed generally in its center to accommodate a passage therethrough of the extended portion 44 of the fastener 40.

It has been found preferable to arrange the modules 60 in a parquet-like arrangement as shown in FIG. 7 to minimize the undesirable effects of shrinkage of the ceramic fiber during high temperature operation.

Another alternative embodiment of the apparatus of the present invention is depicted in FIG. 8. The module 66 in FIG. 8 is formed from a single block 68 of resilient ceramic fiber insulation material which has been transversely cut at a location designated 70 with, say, a band saw in a manner to generally define a first ceramic fiber mat 12 and a second ceramic fiber mat 24. A supporting member 28 formed of expanded metal or the like may be inserted into the saw-cut portion of the block 68. The supporting member 28 rigidizes the block 68 and provides a surface against which a fastener 72 can bear during installation. The fastener 72 can be passed into the hot face 14 of the module 66 as shown in FIG. 8, through the first ceramic fiber mat 12 and brought into registry with an aperture 74 generally centrally positioned in the fastening zone 38 of the supporting member 28 shown in FIG. 8. The dotted lines 76 leading from the fastener 72 to the hot face 14 of the first mat 12 show generally the path of movement of the fastener 72 during an installation or assembly process. The dotted lines 78 leading from the supporting member 28 toward the insulation block 68 show generally the path of movement of the supporting member 28 during assembly of the module 66 prior to installation. Ceramic cement 30, 32 may be applied to the supporting member 28 prior to its being inserted into the block 68 to provide additional structural support for the first and second mats 12, 24 and to maintain the supporting member 28 in a fixed position relative to the fastener 72. Moreover, the cement 30, 32 will serve to hold the first ceramic fiber mat 12 and the second ceramic fiber mat 24 tightly together.

In preferred form the block 68 of the module 66 depicted in FIG. 8 would have dimensions of approximately 12″×12″ at the hot face and be approximately 4″ thick. Preferably the block 68 would be fashioned from a resilient ceramic fiber material wherein the fibers are arranged in planes perpendicular to the hot (and cold) face of the module and in which planes the fibers are generally randomly oriented.

SUMMARY OF THE ADVANTAGES AND SCOPE OF THE INVENTION

It will be appreciated that in constructing a ceramic fiber insulation module according to the present invention, certain significant advantages are provided.

In particular, the supporting member, cement, and at least a portion of the fastener are maintained in a relatively warm zone of the module. That is, the temperature in the plane of the supporting member will be several hundred degrees higher than the temperature at the cold face of the module. With this arrangement, although water vapor and corrosive gases in the furnace might penetrate into the insulation module the supporting member, cement and part of the fastener will not be vulnerable to the deleterious effects of these condensates. At the cold face there may be some condensation particularly if the cold face is below, say, 200° F. It will be appreciated that the cooler the cold face, the greater the occurrence of condensation. In any event if condensation of water vapor and corrosive gases occurs, it will be at a location removed from the supporting member, cement and at least a portion of the fastener. The supporting member, cement and fastener will be nearer to the hot face and, hence, will be in a plane where the temperature is too high for the corrosive gases and water vapor to condense.

With the arrangement of the present invention the undesirable effects a strong acid or strong alkaline liquid on the cement utilized to affix the ceramic fiber material to the supporting member will be minimized. In addition, the undesirable effects of such corrosive liquids on, say, the washer portion of the fastener will be minimized.

The foregoing description of the invention has been directed to particular preferred embodiments in accordance with the requirement to the Patent Statute and for the purposes of explanation and illustration. It will be apparent, however, to those skilled in this art that many modifications and changes in both the apparatus and assembly method may be made without departing from the scope and spirit of the invention. For example, a wide variety of fasteners exist in the art which may be suitable for attaching the modules of the present invention to a furnace casing. In addition, there are wide variety of ceramic fiber materials whose fiber arrangements may depart from that described in connection with the presently preferred embodiments of the invention but which would be satisfactory to practice the present invention.

It will be further apparent that the invention may also be utilized, with suitable modifications within the state of the art, and other modifications of the invention particularly with respect to fasteners and ceramic fiber will be apparent to those skilled in this art. It is the applicant's intention in the following claims to cover all such equivalent modifications and variations which fall within the true spirit and scope of the invention.

What is claimed is:

1. A high temperature insulation module for use in a chamber containing a corrosive atmosphere, comprising:

a first ceramic fiber mat, the first mat having a hot face adapted for exposure to the interior of a high temperature chamber, the first mat having a thickness, the first mat having a rear face generally opposite from the hot face;

a support member, the support member being disposed against the rear face of the first mat, the support member being displaced from the hot face of the first mat by at least the thickness of the first mat to protect the support member from excessive heat;

a second ceramic fiber mat, the second mat having a front face disposed against the support member, the second mat having a thickness, the second mat having a cold face generally opposite from the front face, the second mat being adapted to maintain the support member in a region displaced from the cold face by at least the thickness of the second mat; and, the first mat, the support member and the second mat forming a module, the support member being positioned between the first mat and the second mat and being displaced from the cold face in a zone of the module where the temperature at the zone during operation of the chamber will generally be too high for corrosive gases and water vapor to condense.

2. The module of claim 1, wherein said first ceramic fiber mat is comprised of resilient ceramic fiber material.

3. The module of claim 1, wherein said first ceramic fiber mat is comprised of a plurality of side-by-side strips of resilient ceramic fiber insulation material.

4. The module of claim 1, wherein said first and said second mats are comprised of a single resilient fibrous block, said block being comprised of a plurality of side-by-side planes of ceramic fiber material wherein said fibers are randomly arranged within said planes.

5. The module of claim 4 wherein said block has been cut transversely prior to installation.

6. The module of claim 1, wherein said second ceramic fiber mat is comprised of resilient ceramic fiber material.

7. The module of claim 6 wherein said second mat is comprised of a blanket material with the fibers arranged in planes generally parallel to said cold face.

8. The module of claim 1, wherein said support member is rigid with respect to said first and said second mats.

9. The module of claim 8 wherein said support member is comprised of expanded metal.

10. The module of claim 8 wherein said support member is comprised of insulation material.

11. The module of claim 1, further including a fastener carried by said module.

12. The module of claim 11 wherein said fastener is actuated by insertion of a tool through said hot face.

13. The module of claim 11 wherein said fastener is attached to the wall of the high temperature chamber by welding.

14. The module of claim 11 wherein said fastener is attached to the wall of the high temperature chamber by rotating a threaded member.

15. The module of claim 1, further comprising cement intermediate said first and said second mats generally around an outer perimeter of said support member.

16. The module of claim 15 wherein cement is applied to a hot side of said support member.

17. The module of claim 15 wherein cement is applied to a cold side of said support member.

18. A high temperature insulation module for use in a chamber containing a corrosive atmosphere, said module comprising:

a first ceramic fiber mat defining a hot face of the module;

a second ceramic fiber mat defining a cold face of the module;

said first and said second mats being comprised of a single resilient fibrous block, said block being comprised of a plurality of side-by-side planes of ceramic fiber material wherein said fibers are randomly arranged within said planes, said block having been cut transversely prior to installation; and, a support member positioned intermediate said first and said second mats, said support member being cooperable with a fastener positionable below the hot face intermediate said hot face and said cold face to affix the module to a wall of a high temperature chamber and maintain said support member at a location whereat during operation of the chamber the temperature exceeds that at which corrosive gases can condense.

19. A high temperature insulation module for use in a chamber containing a corrosive atmosphere, comprising:

a first ceramic fiber mat, the first mat having a hot face adapted for exposure to the interior of a high temperature chamber, the first mat having a thickness, the first mat having a rear face generally opposite from the hot face;

a planar support member, the support member being disposed against the rear face of the first mat, the support member being displaced from the hot face of the first mat by at least the thickness of the first mat to protect the support member from excessive heat;

a second ceramic fiber mat, the second mat having a front face disposed against the support member, the second mat having a thickness, the second mat having a cold face generally opposite from the front face, the second mat being adapted to maintain the support member in a plane displaced from the cold face by a distance generally equal to the thickness of the second mat; and, the first mat, the support member and the second mat forming a module, the support member being positioned between the first mat and the second mat and being displaced from the cold face in a plane of the module where the temperature at the plane during operation of the chamber will exceed the condensation temperature for corrosive vapors.

* * * * *